United States Patent [19]

Hughes

[11] 4,305,007
[45] Dec. 8, 1981

[54] ELECTRONIC TWO DIRECTIONAL CONTROL APPARATUS

[75] Inventor: John C. Hughes, Etobicoke, Canada

[73] Assignees: Gerald N. Stan; Dellas Stoyko, both of Ontario, Canada

[21] Appl. No.: 68,664

[22] Filed: Aug. 22, 1979

[51] Int. Cl.³ .............................................. G08C 21/00
[52] U.S. Cl. ............................. 307/116; 200/DIG. 1; 328/5
[58] Field of Search ................ 307/116; 200/DIG. 1; 340/365 C, 573; 361/181; 328/5; 324/61 R, 60 C

[56] References Cited

U.S. PATENT DOCUMENTS

| | | | |
|---|---|---|---|
| 2,633,028 | 3/1953 | Fillebrown et al. | 74/5.6 R |
| 2,935,681 | 5/1960 | Anderson | 324/61 P |
| 3,732,557 | 5/1973 | Evans et al. | 340/365 C X |
| 3,772,685 | 11/1973 | Masi | 340/365 C X |
| 3,787,732 | 1/1974 | Larson | 307/116 |
| 3,879,618 | 4/1975 | Larson | 307/116 |
| 4,071,691 | 1/1978 | Pepper, Jr. | 340/365 C X |
| 4,103,252 | 7/1978 | Bobick | 340/365 C X |
| 4,177,421 | 12/1979 | Thornburg | 307/116 X |

Primary Examiner—L. T. Hix
Assistant Examiner—James L. Dwyer
Attorney, Agent, or Firm—Weldon F. Green

[57] ABSTRACT

An electronic two-directional control apparatus responsive to the capacitance of an external object for generating two electrical outputs simultaneously referable as co-ordinates defining the position of an external object in relation to a control surface, four sensing electrodes of approximately equal capacitance symmetrically arranged into pairs of opposing sensing electrodes within a common plane and electrically insulated from one another whereby sensing electrodes define a control surface and whereby sensing electrode capacitances independently vary in response to the proximity of an external object thereto and are electrically connected to an electrical input in such fashion that only the positive portions of the oscillatory potential are equally applied to each sensing electrode; two pairs of resistors electrically connected to sensing electrodes for continuously receiving discharge currents originating from each pair of opposing sensing electrodes, respectively and whereby each discharge current is a function of corresponding sensing electrode capacitance; a detector circuit electrically connected to both pairs of resistors for simultaneously detecting both continuous discharge currents from each pair of resistors, detecting differences therebetween, and generating two electrical outputs respectively.

The electronic two-directional control apparatus may be utilized in combination with a human body act on a universally rotatable mechanical control member for simultaneously generating two electrical outputs referable as co-ordinates defining the position of mechanical control member in relation to control surface.

13 Claims, 7 Drawing Figures

SAWTOOTH OSCILLATOR OUTPUT WAVEFORM

QUADRANT a VOLTAGE WAVEFORM

ELECTRONIC TWO DIRECTIONAL CONTROL APPARATUS

FIELD OF THE INVENTION

This invention relates to improvements in electronic circuitry and particularly electronic circuitry in combination with adjustable controls capable of modifying the circuitry and hence the character of selected electrical outputs within the framework of a reference plane having defined coordinates.

More particularly, this invention relates to improvements in electronic control apparatus responsive to the change in capacitance established by a displaceable conducting external object, the control member, in relation to an electrical field presented in selected spatial arrangement by such circuitry to define such reference plane whereby at least two selected electrical outputs can be simultaneously generated which outputs are characterized by the position taken by such external control member within the reference plane.

BACKGROUND OF THE INVENTION

Prior art of interest which affords background to the invention to be described and illustrated includes the following United States patents:

U.S. Pat. No. 2,633,028 discloses electronic devices which utilize capacity signals derived from the relative positioning of components.

U.S. Pat. No. 2,935,681 is of interest in that it reveals a proximity device designed to probe the surface contour of an object and employs variation in the capacitance of circuitry to accomplish same.

Still another U.S. Pat. No. 3,772,685 reveals detection mechanisms responsive to the capacitance established by the human body but limited to employing liquid crystal cells.

U.S. Pat. No. 3,787,732 employs an electronic switching device operated by human touch. According to this disclosure however it is the resistance offered by the skin as opposed to capacitance, that is the significant concern.

Finally U.S. Pat. No. 3,879,618 outlines a human touch sensitive device but like latter mentioned U.S. Pat. No. 3,787,732 utilizes resistance introduced by human touch to trigger the signal.

OBJECTS OF THE INVENTION

It is an object of this invention to provide improved circuitry and components capable of closely detecting and utilizing the variation in capacitance established by a suitable displaceable and grounded conductor such as a human body, for example, the finger or other conducting member either of which may constitute the control component of the device which in moving in proximity to an electrical field generated by the circuitry within a plane of reference having defined orthogonal coordinates delivers two separate signals of a magnitude or character that precisely reflects the positioning of such control component within the electrical field.

More particularly, it is an object to provide electronic circuitry such that when the control component is in the vicinity of the reference plane defined by the electrical field or "control surface" the coupling of capacitances established by the control component with the selected sensing regions of the circuitry immediately produces a predictable change in at least two delivered output signals.

It is still another object of this invention to control such circuitry precisely through reproducible variation in capacitance and to thereby achieve a predictable level of performance within close limits.

Still another important object of this invention is to provide such control in a form of a displaceable supported member requiring minimal mechanical parts while emphasizing a wide degree of freedom in the positioning of same in proximity to the aforementioned "control surface" which member is suitably contoured in the region of its exposure to the field and so mounted that the energization of the circuitry and signal outputs will be both readily determinable and smoothly accomplished.

FEATURES OF THE INVENTION

According to one preferred arrangement embodying the invention four-like sensing electrodes in the form of condenser plates are arranged in spaced opposed pairs to define a reference plane having orthogonal coordinates and so supported and insulated as to function substantially independently in response to any induced change, the grouped electrodes having a contour which maps out four quadrants of an electrical field to be generated and as well define centrally thereof a region of limited extent of the order of between two to three square inches approximately which contains detectors circuits, suitably separated from such electrodes by a grounded shield, such central region defined by the grounded shield enclosing the detector circuits designed to detect variations in capacitance imposed by the presentation of the finger or other suitable control member to one or to two adjacent quadrants.

More particularly, according to the aforementioned preferred embodiment the circuitry is energized by an input of low voltage typically of the order of two volts and of a high frequency saw tooth signal typically of the order of 200 kHz, supplied to each electrode through a fast recovery silicon diode each electrode in turn being connected to the detector circuit through a principal resistor typically 220 kohms.

Further, according to the preferred embodiment, each of the four sensing electrodes which modify direct current in response to a variation in capacitance is combined or paired with the direct current modified by an opposed electrode with such paired current being filtered and appropriately amplified to the level assigned to the output desired at each of two selected terminals.

The overall effect may be characterized by noting that any differential or variation in the capacitance of the adjoining quadrants defined by the spacially arranged sensing electrodes within the reference plane or "control surface" produces variation in the magnitude or character of output at each of the terminals proportionally to the coordinates of the position of the displaceable control.

When the circuitry is quiescent, that is, when there is no conductor in the vicinity of the quadrants the capacitance of each of the four conducting quadrants is substantially equal and the output of the circuitry at the two terminals can be adjusted to a mid range value or level.

These and other objects and features are outlined in the following description to be read in conjunction with the sheets of drawings in which.

Figure 1:
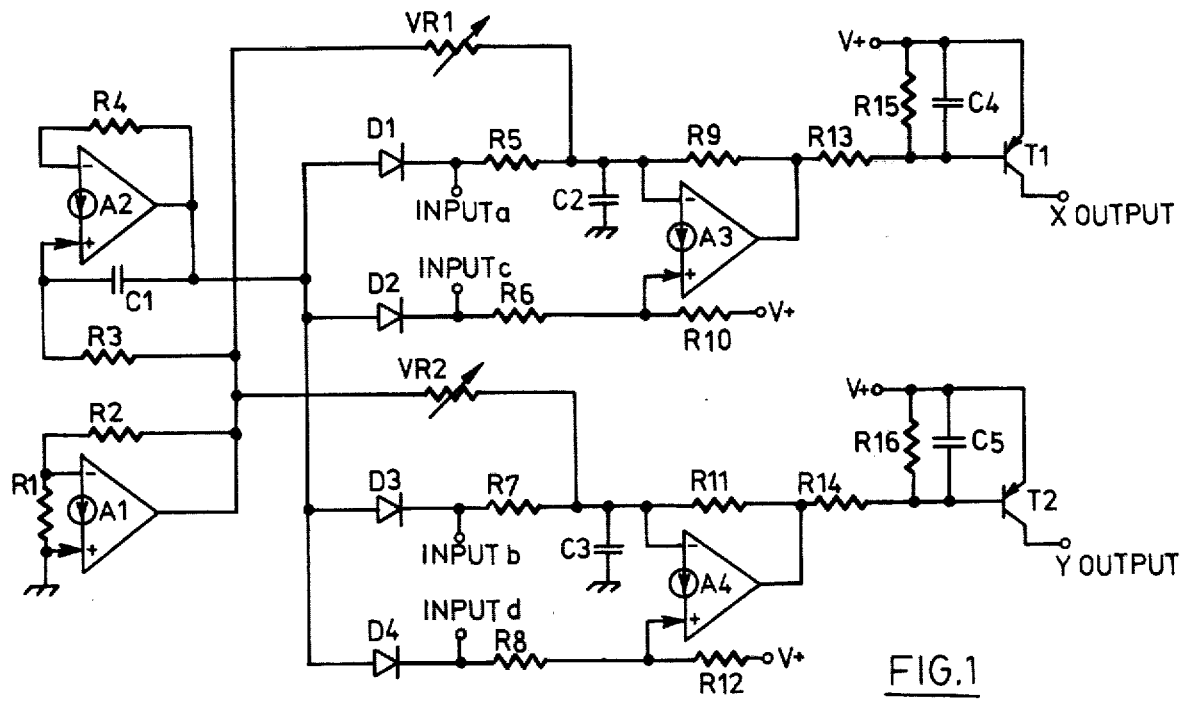
FIG. 1 is a diagram of preferred circuitry embodying the subject matter of the invention.
Figure 2:
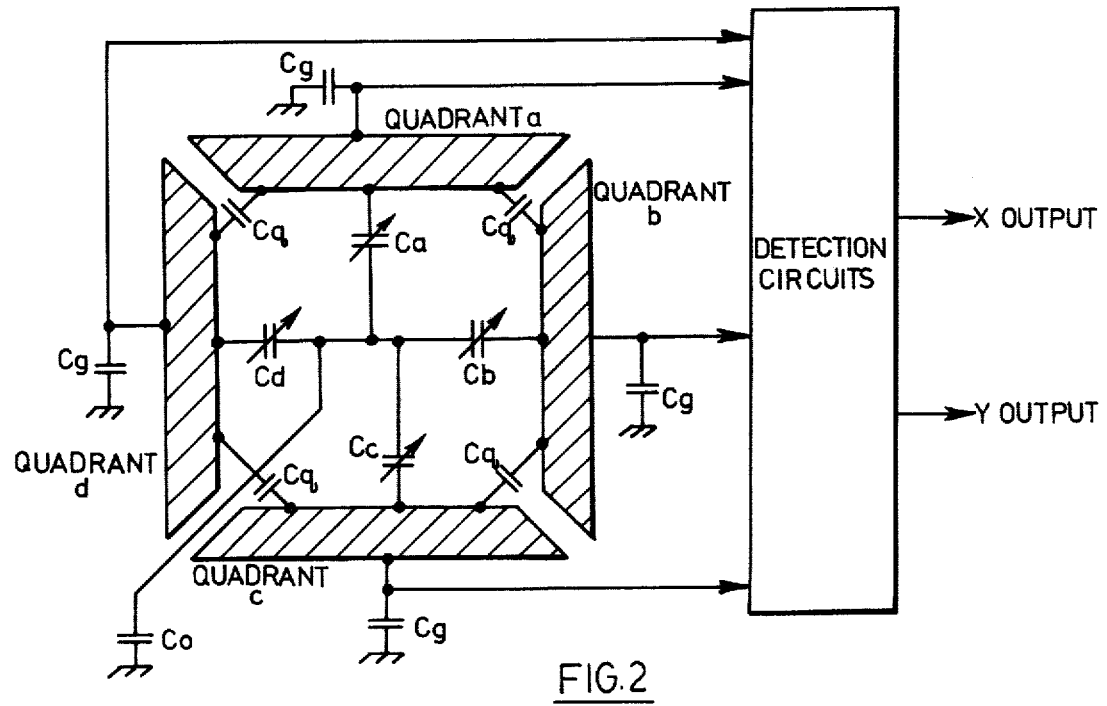
FIG. 2 is a schematic diagram illustrating the arrangement of electrodes of four condenser plates arranged to present the sensing quadrants within a reference plane including circuitry linking the electrodes to the detection circuits.
Figure 3:
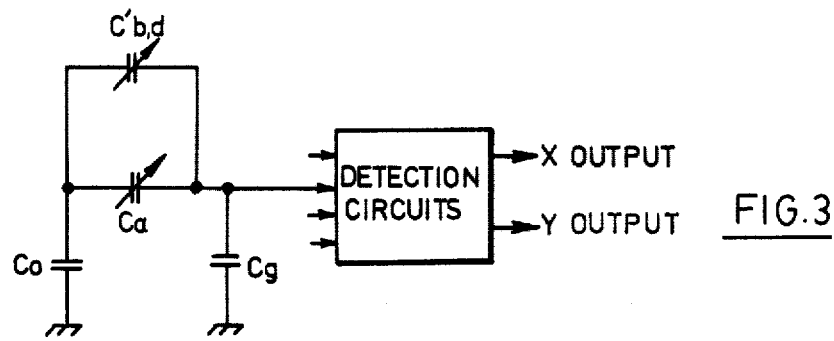
Figure 4:
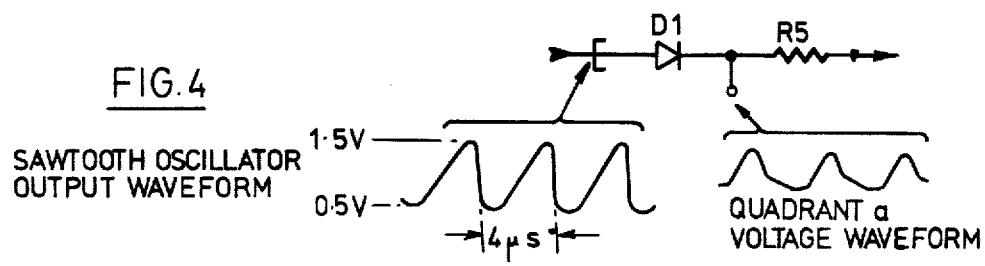
Figure 5:
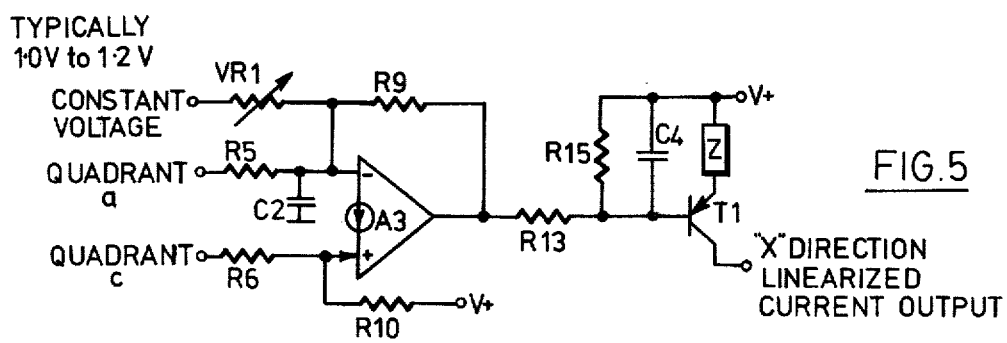
Figure 6:
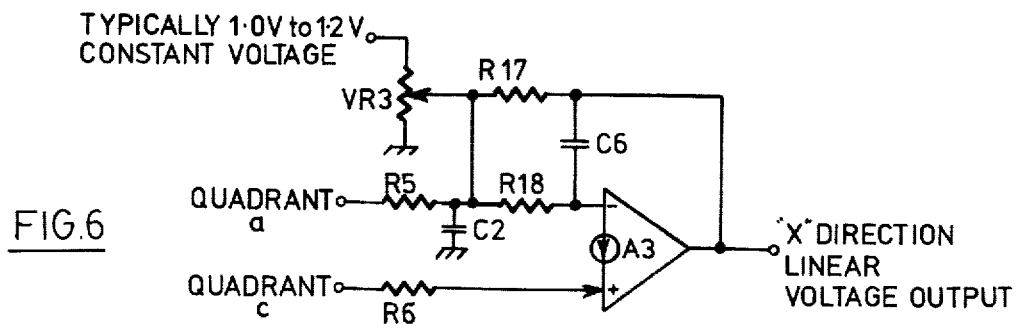
Figure 7:
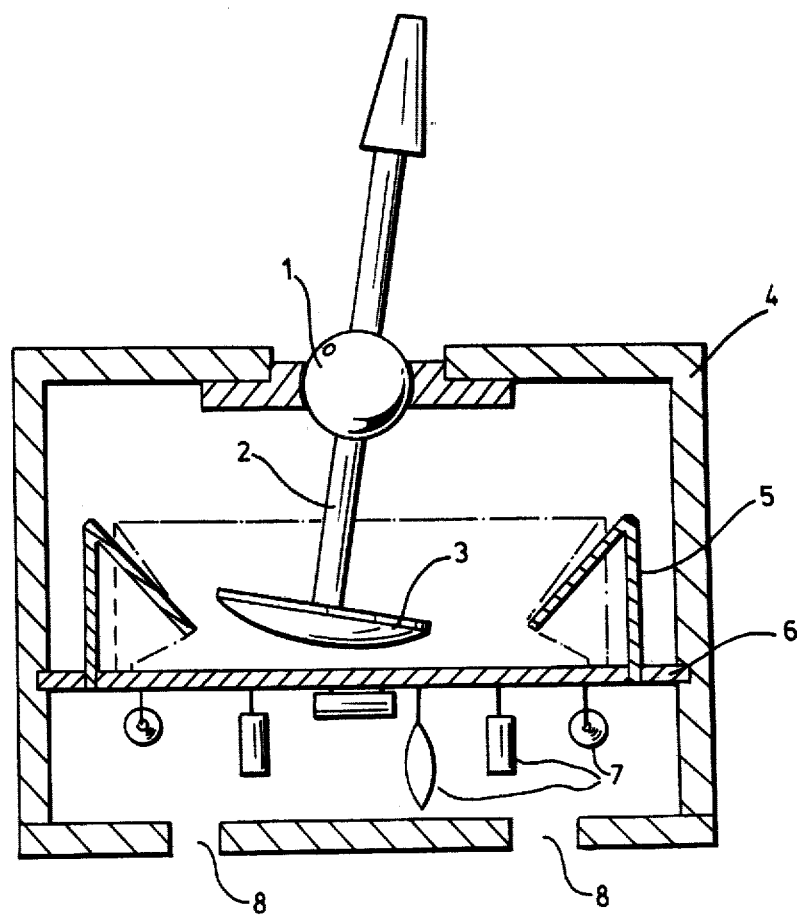

FIG. 3 constitutes a more simplified schematic diagram of the arrangement illustrated in FIG. 2;

FIG. 4 illustrates the nature of the wave forms derived from typical circuitry illustrated by FIGS. 1 to 3 of the drawings;

FIG. 5 discloses a modified portion of the circuitry of FIG. 1 designed to linearize current output;

FIG. 6 illustrates still a further modification to a portion of the circuitry of FIG. 1 which is designed to linearize voltage output; and FIG. 7 is a diagrammatic representation partly in vertical cross-section illustrating selected components of the device embodying the invention and their juxtaposition.

DESCRIPTION OF THE INVENTION

The circuitry outlined in FIG. 1 of the drawings is designed to produce two non-linear current source outputs at the source terminals identified as X output and Y output respectively.

The source of X output and of Y output as illustrated in FIG. 1 are derived respectively from the collectors of transistors $T_1$ and $T_2$ when the circuitry is energized with a positive voltage, typically of the order of 5 volts through terminals $V_+$.

The electrical compliance of the X and Y current outputs in FIG. 1 is equal to the supply voltage whereas the magnitude or strength of the current at terminal X output is derived from or depends upon the difference in the electrical capacitance existing between the terminals identified as $Input_a$ and $Input_c$ respectively.

Likewise, the magnitude or strength of the current at Y output terminal in FIG. 1 is derived from or depends on the difference in the electrical capacitance existing between terminals identified as $Input_b$ and $Input_d$.

Further, according to the invention as illustrated by the circuitry of FIG. 1, the currents at X output and Y output respectively depend on the aforementioned input capacitance differences in a non-linear way which arrangement simulates a variable resistor that would be connected to a positive supply voltage at terminals $V_+$.

The operation of the circuitry is explained as follows:

Resistors $R_1$ and $R_2$ act as a potential divider to feed back part of the output voltage of amplifier $A_1$ to its negative input. This produces a relatively constant voltage at the output of $A_1$ approximately 1.2 volts when $R_1 = R_2$ which $A_1$ output is used to provide a constant bias current for amplifiers $A_2$, $A_3$ and $A_4$ through resistors $R_3$ and variable resistors $VR_1$ and $VR_2$. The resistors $VR_1$ and $VR_2$ are variable in order to facilitate adjustment of the output quiescent current levels.

Amplifier $A_2$ operates as a saw tooth oscillator with the oscillation period being determined by resistor $R_4$ and capacitor $C_1$ and is typically 200 to 300 kHz.

The oscillatory voltage output from amplifier $A_2$ is connected to the input terminals a, b, c and d by diodes $D_1$, $D_3$, $D_2$ and $D_4$ respectively which are designed to permit only the positive portion of the supplied oscillatory voltage to charge the capacitors at the input terminals.

At the most positive portion of the charging phase, the voltages at all four input terminals Input a, b, c and d are approximately the same.

During the negative portion of the oscillation cycle the input capacitors discharge through resistors $R_5$, $R_6$, $R_7$ and $R_8$ since diodes $D_1$, $D_2$, $D_3$ and $D_4$ are then reverse-biased and non-conducting. Because the amplifiers $A_1$, $A_2$, $A_3$ and $A_4$ are Norton types, the voltages at the amplifier inputs have an approximately constant value of 0.6 volts during normal operation. Thus the mean currents flowing through resistors $R_5$, $R_6$, $R_7$ and $R_8$ are determined by the respective values of the capacitances of the input terminals with respect to ground.

Four sensing electrodes or quadrants a, b, c, d are provided as illustrated in FIG. 2 and connected to the input terminals $Input_a$, $Input_b$, $Input_c$, $Input_d$.

It is intended that the electrodes or quadrants should have their capacitance altered or varied in relation to the position taken, for example, by the finger of an operator or the position of any control instrument.

Amplifier $A_3$ is intended to amplify the difference of the mean currents flowing in resistors $R_5$ and $R_6$ and produce a voltage output which varies in proportion to such difference.

The gain of amplifier $A_3$ is determined by the ratio of resistors $R_9$ and $R_5$ while resistor $R_{10}$ provides a bias current to the positive input of amplifier $A_3$.

By making $R_9$ and $R_{10}$ equal in value the dependence of the current delivered at the X output upon the supply voltage at $V_+$ is minimized.

Capacitors $C_2$ and $C_4$ are intended to filter out the ripple voltage arising from the oscillatory input derived from amplifier $A_2$.

Resistors $R_{13}$ and $R_{15}$ form a potential divider which matches the output of amplifier $A_3$ to the base of transistor $T_1$ to produce the required non-linear current output at the X output terminal of FIG. 1 in response to the difference in capacitance of the inputs at $Input_a$ and $Input_c$.

Amplifier $A_4$ is located in corresponding circuitry including resistors and capacitors and is intended to operate in the same way as amplifier $A_3$ but amplifies the difference of the means currents flowing in resistors $R_7$ and $R_8$ to produce the Y output at the collector of transistor $T_2$.

Typical component values are:

| | |
| --- | --- |
| $R_1, R_2, R_3, R_4$ | 47 kilohms |
| $R_5, R_6, R_7, R_8$ | 220 kilohms |
| $R_9, R_{10}, R_{11}, R_{12}$ | 10 to 15 megohms |
| $R_{13}, R_{14}, R_{15}, R_{16}$ | 15 kilohms |
| $VR_1, VR_2$ | 2.5 megohms |
| $C_1$ | 15 picofarads |
| $C_2, C_3$ | 0.1 microfarads |
| $C_4, C_5$ | 10 microfarads |

According to FIG. 2 electrical capacitances are associated in the circuitry with the sensing electrodes or quadrants a,c and b,d which are connected respectively to the Inputs a, c and b, d.

All quadrants a, b and c, d have like dimensions and configurations and are adapted to be symmetrically arranged to define a plane of reference or "control surface" having orthogonal coordinates and contain or present a central region of an area of the order of 2 to 3 square inches.

The undisturbed capacitance $C_g$ with respect to ground of each quadrant has effectively the same value typically 5 to 10 picofarads.

Further there is an interquadrant capacitance $C_q$ between adjacent sensing electrodes as illustrated in FIG. 2 of the order of from 2 to 3 picofarads.

The capacitance between opposing quadrants a, c and b, d is negligible. When a grounded external object is presented in the region above and between opposed quadrants a, c and opposed quadrants b, d, additional capacitances $C_a$, $C_c$ and $C_b$, $C_c$ respectively are provided between each respective quadrant and the grounded external object. The grounded external object will have a capacitance $C_o$ with respect to ground in the order of 100 picofarads or more (for example, part of the operator's body).

In particular, when the finger of an operator is presented in the region between and above the quadrants the capacitances $C_a$, $C_b$, $C_c$ and $C_d$ are in series with the operator's body to ground capacitance $C_o$ and, therefore, produce in effect an additional capacitance to ground for each quadrant a, b, c and d of up to 5 picofarads.

Operation of the device depends upon the detection of variations in the capacitances $C_a$, $C_b$, $C_c$ and $C_d$ which can be typically up to 20% of the effective ground capacitance of each quadrant.

The detection circuits can be described with reference to FIG. 1 or with reference to modified forms such as in FIGS. 5 and 6 which are designed respectively to produce a linearized current output or a linearized voltage output but still use the basic charge-discharge approach described.

The relationship between the capacitances of FIG. 2 and a single quadrant, for example, quadrant a can be illustrated by FIG. 3 which is a simplified diagrammatic outline of the arrangement of FIG. 2.

With reference to FIG. 3, ground capacitance $C_o$ and capacitances $C_a$ and $C_g$ are as earlier described. The variable capacitance identified as C'b, d is derived from the combined effect of $C_b$ and $C_d$ in FIG. 2 in series with the interquadrant capacitance $C_q$.

While this is an undesired effect, it can be used to partially offset the quadrant end effect, that is, the reduction in quadrant-to-operator capacitance as an operator's fingers move parallel to a quadrant from the centre towards one end. The end effect can also be reduced by making the inside edges of each quadrant concave.

Typical signal wave forms generated can be observed by using a high impedance oscilloscope and are illustrated in FIG. 4.

FIG. 5 illustrates circuit modifications required to provide a linearized current source output. In this drawing the modification includes the insertion of an impedance between the emitter lead of transistor T1 and the positive supply terminal $V_+$.

A similar emitter series impedance would be connected to transistor T2 having regard to FIG. 1 where this modification would be undertaken.

The resistor Z would be typically of the order of about 100 ohms but other substitute components or networks could be used.

The effect of including the resistor Z is the reduction of the non-linear transfer characteristic of transistor T1. The other components identified in FIG. 5 function as described in relation to FIG. 1.

FIG. 6 illustrates still another circuit modification designed to produce a linear voltage output. Only one output is depicted for this purpose.

Resistors $R_5$, $R_6$ and capacitor $C_2$ and amplifier $A_3$ are as described in relation to FIG. 1.

Resistors $R_{17}$ and $R_{18}$ and capacitors $C_6$ act in conjunction with $R_5$ and $C_2$ and $A_3$ to form a low-pass filter network which eliminates ripple voltage due to the oscillatory voltage at the Inputs $a$ and $c$.

Thus output voltage of amplifier A3 varies in accordance with the difference of the capacitance at Inputs $a$ and $c$.

Potentiometer $VR_3$ is used to set the quiescent output level and the upper terminal of this potentiometer $VR_3$ can be connected either to the source terminal $V_+$ or to the output of amplifier $A_1$ as revealed by FIG. 1.

Typical component values in the circuitry of FIGS. 5 and 6 are:

| | |
|---|---|
| $R_5$, $R_6$ | 220 kilohms |
| $R_{17}$ | 10 megohms |
| $R_{18}$ | 22 kilohms |
| $VR_3$ | 1 megohms |
| $C_2$ | 0.1 microfarads |
| $C_6$ | 0.001 microfarads or 470 picofarads |

FIG. 7 is intended to illustrate the application of the circuitry and the invention to a mechanical control. Such device will have a potentially longer operational life for the following reasons.

According to the invention a control component is comprised of a ball joint generally indicated at 1 carrying a vertically extending shaft or displaceable member 2 presenting a part spherical portion 3 lowermost within a region centrally between the spaced quadrant a, b, c and d typically indicated by 5 in FIG. 7.

The ball joint formation 1 is supported centrally from the enclosure or housing 4 within which the electronic circuitry is adapted to be retained which enclosure 4 aids in reducing radio frequency radiation from the operation of the circuitry and minimizes the effect of any external electrical noise and hence reduces the likelihood of a capacitance change through movement of any nearby object.

The ball joint 1 permits an operator to universally rotate the shaft 2 and part spherical portion 3 through a part spherical path centred on the ball joint giving such arrangement a substantial degree of freedom over the region centred between the pairs of opposing quadrants a, b, c, d.

It is to be understood that the part spherical portion 3 is electrically conducting and attached in an electrically conducting fashion to vertically extending shaft 2 which itself is electrically connected to the grounded housing ball via the joint 1.

Shield 6 separates the quadrants a, b, c and d from the detector circuits indicated generally at 7.

Such arrangement of control components and electronic circuitry will have a potentially longer operational life because of the minimal wear experienced by the ball joint 1. Also the lowermost portion 3 which is substituted for the finger of the operator has a fixed position in terms of the centre defined by the ball axis 1 and dictates reproducible positions throughout its path of travel and will maintain a constant output at a given set of coordinates within the reference plane or field.

Housing 4 is also provided with access openings 8 to permit the entry of trimming tools to adjust the variable resistors so as to provide quiescent outputs at a mid-range value.

Access openings 8 also serve to provide paths for the power and output leads.

It will be understood in relation to FIG. 7 that by manually rotating shaft 2, about ball joint 1, part spherical portion 3 will accordingly be displaced in relation to quadrants a, b, c, d and the operation of electronic circuitry will be that as described above.

While the preferred embodiments of the improvements in electronic control apparatus and circuitry have been described and illustrated those persons skilled in the art may make variations, alterations or substitutions without departing from the spirit and scope of the invention as described in the appended claims.

What I claim is:

1. In a device for generating at least two interrelated electrical outputs, the combination of;
   (a) at least four sensing means presenting a two-directional electrical field of selected orthogonal coordinates and strength, whereby a change in capacitance in each of said sensing means in said two directions can be detected upon the entry of a grounded conductor within the boundary of said field;
   (b) a first means for generating a first electrical output of selected characteristics and strength in response to a change in capacitance to be imposed upon two of said sensing means, whereby the strength of said first output is derived from the difference in capacitance between said two sensing means, and whereby said first output is referable to define the position of said grounded conductor along one of said directions;
   (c) a second means for generating a second electrical output of selected characteristics and strength in response to a change in capacitance to be imposed upon said other two sensing means, whereby the strength of said second output is derived from the difference in capacitance between said other two sensing means, and whereby said second output is referable to define the position of said grounded conductor along said other direction; and
   (d) means for communicating each of said detected changes in capacitance in said two sensing means and said other two sensing means to said first generating means and to said second generating means respectively.

2. In a device according to claim 1 in which control means are provided for implementing the generation of said first and second electrical outputs respectively including displaceable conductor means, means for supporting said displaceable conductor means centrally above said opposing pairs of electrodes and in close proximity thereto for movement throughout said electrical field centred upon a fixed radius, whereby the electrical capacitance to be imposed is reproduceable throughout a range of selected values.

3. In apparatus for generating two interrelated outputs the combination of;
   (a) at least four electrodes of approximately equal capacitance connected in spaced opposed pairs and within a common plane to define a two directional electrical field having orthogonal coordinates and so insulated from one another whereby each of said paired electrode capacitances can be varied independently in response to the entry of a grounded conductor into said electrical field;
   (b) electrical input means associated with said paired electrodes for energizing same including means for applying only positive portions of an oscillatory potential to each said paired electrodes whereby each said paired electrodes is charged positively during positive portions of said oscillatory cycle and partially discharged during negative portions of said oscillatory cycle;
   (c) first means associated with said electrical input means for generating a first electrical output of selected characteristics in response to a change in capacitance imposed thereupon;
   (d) second means associated with said electrical input means for generating a second electrical output of selected characteristics in response to a change in capacitance to be imposed thereupon;
   (e) means for establishing electrical communication between one pair of said paired electrodes and said first generating means and between the other pair of said paired electrodes and said second generating means whereby changes in capacitance upon entry of a grounded conductor within the boundary of said electrical field are simultaneously communicated to said first generating means and to said second generating means respectively; and
   (f) control means for implementing the generation of said first and second electrical outputs respectively including displaceable conductor means, means supporting said displaceable conductor means centrally above said opposing pairs of electrodes and in close proximity thereto for movement throughout said electrical field centred upon a fixed radius, whereby the electrical capacitance to be imposed is reproducible throughout a range of selected values.

4. In an electronic two-directional control apparatus provided with electrical input means responsive to the capacitance of an external object for generating two electrical outputs simultaneously, referable as co-ordinates defining the position of said external object in relation to a control surface, including:
   (a) four sensing electrodes of approximately equal capacitance, symmetrically arranged into pairs of opposing sensing electrodes within a common plane and electrically insulated from one another whereby said sensing electrodes define said control surface and whereby said sensing electrode capacitances independently vary in response to the proximity of said external object in relation to said control surface;
   (b) means associated with electrical input means whereby only the positive portions of an oscillatory potential are equally applied to each of said sensing electrodes, and whereby each sensing electrode is charged positively during positive portions of said oscillatory cycle and partially discharged during negative portions of said oscillatory cycle;
   (c) first electrical conducting means for establishing electrical communication between said electrical input means and each of said sensing electrodes;
   (d) two pairs of resistance means for continuously receiving discharge currents originating from each pair of said opposing sensing electrodes, respectively, whereby each discharge current is made a function of corresponding sensing electrode capacitance;

(e) second electrical conducting means for establishing electrical communication between said two opposing pairs of sensing electrodes and said two pairs of resistance means respectively;

(f) means for physically positioning said external object in close proximity to said control surface causing said electrical capacitance of said sensing electrode to vary and thereby causing each of said discharge currents to vary in response thereto;

(g) detector circuit means for simultaneously detecting both continuous discharge currents from each pair of resistance means detecting differences therebetween and generating two electrical outputs respectively referable as coordinates defining the position of said external object in relation to said controlled surface; and (h) third electrical conducting means for establishing electrical communication between said two pairs of resistance means and said detector circuit means.

5. Apparatus according to claim 4 wherein said detector means includes adjusting means for individually adjusting each said electrical outputs.

6. Apparatus according to claim 4 wherein said electrical input means includes means for generating a high frequency saw tooth electrical signal.

7. Apparatus according to claim 4 wherein positioning means for said apparatus is provided in the form of a grounded conductor having a capacitance of the order of at least 100 picofarads.

8. Apparatus according to claim 4 wherein said detector circuit means generate at least one of said electrical outputs as an electrical current varying in a predictable non-linear manner with said difference between said discharge currents from said corresponding pair of resistance means.

9. Apparatus according to claim 4 wherein said detector circuit means generate at least one of said electrical outputs as an electrical current varying in a predictable linear manner with said difference between said discharge currents from said corresponding pair of resistance means.

10. Apparatus according to claim 4 wherein said detector means generate at least one of said electrical outputs as an electrical voltage varying in a predictable linear manner with said difference between said discharge currents from said corresponding pair of resistance means.

11. Apparatus according to claim 3 wherein said first generating means and said second generating means include means for independently adjusting their respective electrical outputs.

12. Apparatus according to claims 3 or 8 wherein said electrical input means includes amplifier means for generating a high frequency saw tooth signal.

13. Apparatus according to claims 3 or 8 wherein displaceable conductor means is supported to enter said electrical field and define a part spherical path, said displaceable conductor means having a capacitance of at least the order of 100 picofarads.

* * * * *